(12) United States Patent
Alterman (10) Patent No.: US 12,174,895 B2
(45) Date of Patent: Dec. 24, 2024

(54) SYSTEMS AND METHODS FOR SOCIAL MATCHING WITH PARTIAL, CONDITIONAL IMAGE REVEAL

(71) Applicant: Hatch Networks, Inc., Atlanta, GA (US)

(72) Inventor: Mitchell Evan Alterman, Atlanta, GA (US)

(73) Assignee: Hatch Networks, Inc., Atlanta, GA (US)

( * ) Notice: Subject to any disclaimer, the term of this patent is extended or adjusted under 35 U.S.C. 154(b) by 0 days.

(21) Appl. No.: 18/327,598

(22) Filed: Jun. 1, 2023

(65) Prior Publication Data

US 2023/0401261 A1    Dec. 14, 2023

Related U.S. Application Data (60) Provisional application No. 63/366,099, filed on Jun. 9, 2022.

(51) Int. Cl.
  *G06F 16/9035*    (2019.01)
  *G06Q 50/00*    (2012.01)

(52) U.S. Cl.
  CPC ......... *G06F 16/9035* (2019.01); *G06Q 50/01* (2013.01)

(58) Field of Classification Search
  CPC ............................ G06F 16/9035; G06Q 50/01
  See application file for complete search history.

(56) References Cited

U.S. PATENT DOCUMENTS

| | | |
|---|---|---|
| 7,212,985 B2 | 5/2007 | Sciuk |
| 7,613,706 B2 | 11/2009 | Terrill et al. |
| 7,684,651 B2 | 3/2010 | Tang et al. |
| 7,725,525 B2 | 5/2010 | Work |
| 7,958,117 B2 | 6/2011 | Pettinati et al. |
| 8,515,936 B2 | 8/2013 | Hansen et al. |
| 8,583,563 B1 | 11/2013 | Bonilla et al. |
| 8,612,359 B2 | 12/2013 | Hull et al. |
| 8,727,885 B2 | 5/2014 | Berger et al. |
| 8,780,163 B2 | 7/2014 | Cahill et al. |
| 8,812,604 B2 | 8/2014 | Work |
| 9,148,333 B2 | 9/2015 | Bustamente |
| 9,495,391 B1 | 11/2016 | Koh et al. |
| 9,558,244 B2 | 1/2017 | Busey et al. |
| 10,320,734 B1 | 6/2019 | Mishra et al. |
| 10,565,276 B2 | 2/2020 | Finder |
| 10,747,830 B2 | 8/2020 | Snyder |
| 10,887,270 B1 | 1/2021 | Adamski et al. |
| 10,943,243 B2 | 3/2021 | Herbst et al. |

(Continued)

*Primary Examiner* — Dangelino N Gortayo
(74) *Attorney, Agent, or Firm* — GREENBERG TRAURIG LLP (57) ABSTRACT

Systems and methods for social matching with partial, conditional picture reveal are disclosed. A method may include: (1) receiving a profile and a picture from a plurality of users; (2) identifying a potential match between two users based on the profiles; (3) presenting an obscured or covered picture of the users to each other; (4) presenting a first question to the users; (5) receiving responses to the first question from the users; (6) determining, by the computer program, that the responses to the first question match; and (7) revealing, by the computer program, a first portion of the pictures to the users, wherein a first remaining portion of the pictures remains obscured or covered.

20 Claims, 4 Drawing Sheets

(56) References Cited

U.S. PATENT DOCUMENTS

| | | |
|---|---|---|
| 11,216,585 B1 | 1/2022 | Clediere |
| 11,470,051 B1* | 10/2022 | Berkas .................... H04L 51/52 |
| 2016/0248864 A1* | 8/2016 | Loia ....................... G06Q 50/01 |
| 2018/0234588 A1* | 8/2018 | Chen ....................... H04L 51/52 |
| 2019/0288972 A1* | 9/2019 | Morrison ................ H04L 51/52 |
| 2020/0364806 A1 | 11/2020 | Wang et al. |
| 2021/0049710 A1 | 2/2021 | Haywood |
| 2021/0124845 A1* | 4/2021 | Adamski ............... H04L 51/216 |
| 2021/0209700 A1 | 7/2021 | Lubash |
| 2022/0121839 A1* | 4/2022 | Tagra ................... G06V 40/172 |

* cited by examiner

SYSTEMS AND METHODS FOR SOCIAL MATCHING WITH PARTIAL, CONDITIONAL IMAGE REVEAL

RELATED APPLICATIONS

This application claims priority to, and the benefit of, U.S. Provisional Patent Application Ser. No. 63/366,099, filed Jun. 9, 2022, the disclosure of which is hereby incorporated, by reference, in its entirety.

BACKGROUND OF THE INVENTION

1. Field of the Invention

Embodiments relate to systems and methods for social matching with partial, conditional picture reveal.

2. Description of the Related Art

The use of an on-line dating service to find a match is becoming more and more common. In general, customers of these services complete a personal profile and a profile for their desired match. The service then uses algorithms to identify potential matches, and provides an introduction for those matches.

SUMMARY OF THE INVENTION

Systems and methods for social matching with partial, conditional picture reveal are disclosed. According to an embodiment, a method for social matching with partial, conditional picture reveal may include: (1) receiving, by a computer program, a profile and a picture from a plurality of users; (2) identifying, by the computer program, a potential match between a first user and a second user based on the profiles; (3) presenting, by the computer program, a picture of the first user to a second user electronic device associated with the second user, and a picture of the second user to a first user electronic device associated with the first user, wherein the picture of the first user and the picture of the second user are obscured or covered; (4) presenting, by the computer program, a first question to the first user electronic device and the second user electronic device; (5) receiving, by the computer program, responses to the first question from the first user electronic device and the second user electronic device; (6) determining, by the computer program, that the responses to the first question meet a first matching criteria for the first question; and (7) revealing, by the computer program, a first portion of the picture of the first user to the second user electronic device and a first portion of the second user to the first user electronic device, wherein a first remaining portion of the pictures remains obscured or covered.

In one embodiment, the method may also include: presenting, by the computer program, a second question to the first user electronic device and the second user electronic device; receiving, by the computer program, responses to the second question from the first user electronic device and the second user electronic device; determining, by the computer program, that the responses to the second question meet a second matching criteria for the second question; and revealing, by the computer program, a second portion of the picture of the first user to the second user electronic device and a second portion of the picture of the second user to the first user electronic device, wherein a second remaining portion of the pictures remain obscured or covered.

In one embodiment, the computer program may receive a cover graphic with each profile and picture, and the picture of the first user and the picture of the second user are obscured by the cover graphic received from the respective user.

In one embodiment, the method may also include identifying, by the computer program, primary features and secondary features in each picture, wherein the primary features may include facial features and hair, and the secondary features may include body features below a user neck. The first portion of the picture of the first user and the first portion of the second user may be secondary features, and the second portion of the picture of the first user and the second portion of the picture of the second user may be primary features.

In one embodiment, the method may also include presenting, by the computer program, a first portion of the profile for the first user to the second user, and a first portion of the profile of the second user to the first user, in responses to the first question meeting the first matching criteria.

In one embodiment, the method may also include presenting, by the computer program, a second portion of the profile for the first user to the second user, and a second portion of the profile of the second user to the first user, in responses to the second question meeting the second matching criteria.

In one embodiment, the first matching criteria and the second matching criteria may be matching or not matching.

According to another embodiment, a system may include: a plurality of user electronic devices, each user electronic device associated with a user and executing a computer application; and an electronic device executing a matching and partial reveal computer program, wherein the matching and partial reveal computer program are in communication with the plurality of computer applications, wherein the matching and partial reveal computer program receives a profile and a picture from a plurality of users; identifies a potential match between a first user and a second user based on the profiles; presents a picture of the first user to a second user electronic device associated with the second user, and a picture of the second user to a first user electronic device associated with the first user, wherein the picture of the first user and the picture of the second user are obscured or covered; presents a first question to the first user electronic device and the second user electronic device; receives responses to the first question from the first user electronic device and the second user electronic device; determines that the responses to the first question meet a first matching criteria for the first question; and reveals a first portion of the picture of the first user to the second user electronic device and a first portion of the second user to the first user electronic device, wherein a first remaining portion of the pictures remains obscured or covered.

In one embodiment, the matching and partial reveal computer program may also present a second question to the first user electronic device and the second user electronic device; receive responses to the second question from the first user electronic device and the second user electronic device; determine that the responses to the second question meet a second matching criteria for the second question; and reveal a second portion of the picture of the first user to the second user electronic device and a second portion of the picture of the second user to the first user electronic device, wherein a second remaining portion of the pictures remain obscured or covered.

In one embodiment, the matching and partial reveal computer program may also receive a cover graphic with each profile and picture, and the picture of the first user and the picture of the second user are obscured by the cover graphic received from the respective user.

In one embodiment, the matching and partial reveal computer program may also identify primary features and secondary features in each picture, wherein the primary features may include facial features and hair, and the secondary features may include body features below a user neck.

In one embodiment, the first portion of the picture of the first user and the first portion of the second user may be secondary features, and the second portion of the picture of the first user and the second portion of the picture of the second user may be primary features.

In one embodiment, the matching and partial reveal computer program may also present a first portion of the profile for the first user to the second user electronic device, and a first portion of the profile of the second user to the first user electronic device, in responses to the first question meeting the first matching criteria. The matching and partial reveal computer program may also present a second portion of the profile for the first user to the second user electronic device, and a second portion of the profile of the second user to the first user electronic device, in responses to the second question meeting the second matching criteria.

According to another embodiment, a non-transitory computer readable storage medium may include instructions stored thereon, which when read and executed by one or more computer processors, cause the one or more computer processors to perform steps comprising: receiving a profile and a picture from a plurality of users; identifying a potential match between a first user and a second user based on the profiles; presenting a picture of the first user to a second user electronic device associated with the second user, and a picture of the second user to a first user electronic device associated with the first user, wherein the picture of the first user and the picture of the second user are obscured or covered; presenting a first question to the first user electronic device and the second user electronic device; receiving responses to the first question from the first user electronic device and the second user electronic device; determining that the responses to the first question meet a first matching criteria for the first question, wherein the first matching criteria comprises matching or not matching; and revealing a first portion of the picture of the first user to the second user electronic device and a first portion of the second user to the first user electronic device, wherein a first remaining portion of the pictures remains obscured or covered.

In one embodiment, the non-transitory computer readable storage medium may also include instructions stored thereon, which when read and executed by one or more computer processors, cause the one or more computer processors to perform steps comprising: presenting a second question to the first user electronic device and the second user electronic device; receiving responses to the second question from the first user electronic device and the second user electronic device; determining that the responses to the second question meet a second matching criteria for the second question, wherein the second matching criteria comprises matching or not matching; and revealing a second portion of the picture of the first user to the second user electronic device and a second portion of the picture of the second user to the first user electronic device, wherein a second remaining portion of the pictures remain obscured or covered.

In one embodiment, the non-transitory computer readable storage medium may also include instructions stored thereon, which when read and executed by one or more computer processors, cause the one or more computer processors to receive a cover graphic with each profile and picture, and the picture of the first user and the picture of the second user are obscured by the cover graphic received from the respective user.

In one embodiment, the non-transitory computer readable storage medium may also include instructions stored thereon, which when read and executed by one or more computer processors, cause the one or more computer processors to identify primary features and secondary features in each picture, wherein the primary features comprise facial features and hair, and the secondary features comprise body features below a user neck.

In one embodiment, the non-transitory computer readable storage medium may also include instructions stored thereon, which when read and executed by one or more computer processors, cause the one or more computer processors to present a first portion of the profile for the first user to the second user, and a first portion of the profile of the second user to the first user, in responses to the first question meeting the first matching criteria, and to present a second portion of the profile for the first user to the second user, and a second portion of the profile of the second user to the first user, in responses to the second question meeting the second matching criteria.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for social matching with partial, conditional picture reveal are disclosed.

In embodiments, users may provide profile details some of which may be used to match other users. This may be used, for example, in an online dating environment. Embodiments, however, are not limited to online dating, but any may be used with any other process in which users may be matched with one or more other users.

First, the users may be required to provide a profile picture. Illustratively, users may provide some or all of the following information:

Name;
Email address;
Birthday/Age;
Gender;
Location;
Sexual Orientation;
Match Age Preferences/Desired Age Range of Potential Matches;
Cover graphic or obscuration for partial reveal design;
At least one picture of the user;
Education (e.g., highest degree, college attended, etc.);

Children (have or interest in having);
Professional Details (e.g., job title, employer, industry);
Religion;
Ethnicity; and
Personality adjectives.

It should be recognized that the list of information provided by the users is exemplary only and fewer, additional, or different information may be received as is necessary and/or desired.

If a user gets a question that is extremely important to them, the user may "star" this question. That user can then choose to require all future matches to have either answered the question similarly or differently (depending on what the user wants) to be able to match with that user.

Once the information is received from a plurality of users, an algorithm may generate a match score for pairs of users. Any suitable algorithm may be used to identify matches, and each algorithm may weigh different pieces of information differently. In one embodiment, each user may have its own custom algorithm based on, for example, the importance of certain pieces of information to that user.

In one embodiment, if the algorithm identifies a match with a second user, the one or more pictures of the second user that were provided by the second user may be presented to the user, and the user's pictures may be presented to the second user. The pictures, however, may be masked, covered, or obscured so that neither user can actually view the contents of the pictures. For example, the pictures may be masked or covered with a graphic selected by the providing user, may be masked or covered with a default graphic, or may be masked by pixelation, blurring, etc. Thus, neither user can see the picture of the identified match.

Potential matching users are then presented with one or more questions regarding, for example, their personalities, attitudes, core values, or lifestyles. These questions may be multiple choice questions, yes/no questions, etc. Other types of questions may be provided as is necessary and/or desired.

In one embodiment, each match (two users per match) may be assigned a certain number of questions, that both users must answer the same way in order for the pictures to be revealed. The questions may be based on the users' profiles, or they may be asked to solicit the users' thoughts on dating, money, cohabitation, marriage, children, divorce, etc.

In one embodiment, each question may be assigned a tier, between 1-3, based on their relative importance to potential compatibility. For example, Tier 1, Tier 2 and Tier 3 Questions each have their own point assignment that may contribute to the user's "Match Score" (Tier 1 questions have the most points, then Tier 2, then Tier 3).

If both potential matching users respond the same, a portion of each user's picture may be revealed to the other user, while the remainder of the picture remains masked. The users may also be presented with a portion of the other user's profile. For example, the bottom 25% of each other's picture and 25% of the other potential matching user's profile may be presented. More or less of the picture and/or profile may be presented as is necessary and/or desired.

If the users do not provide the same responses, the picture and/or profile may remain masked, and the users may be presented with another question. The number of nonmatching responses may be limited before the reveal process stops, and the users may need to take a different action in order to see the other user's photo (e.g., pay for the reveal).

Examples are provided in FIGS. 1A-1D. For example, in FIG. 1A, a user has completed his profile and has been presented with a matching opportunity—Caroline. This may be referred to as a "new egg." The picture of Caroline is masked with a graphic. The graphic may be selected by Caroline, may be a default graphic, etc.

Figure 1A:
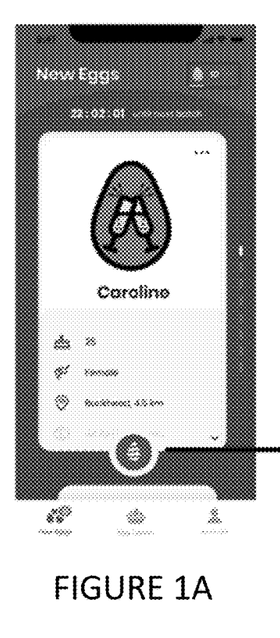
FIGS. 1A-1D illustrate an exemplary user interface according to an embodiment.
Figure 1B:
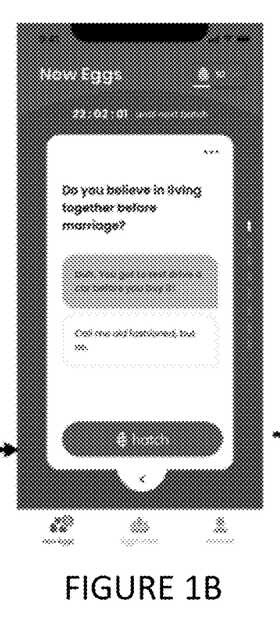

In FIG. 1B, the user has selected Caroline's "new egg" and has been presented with a question. The question may be based on something in the user's profile, something in Caroline's profile, or it may be a question selected from a database of dating or relationship questions. This question has two possible answers, and the user has selected his answer.

At the same time, Caroline is presented with the same question and may select her response.

Figure 1C:
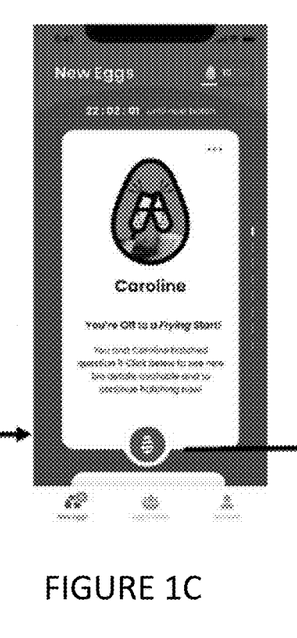
Figure 1D:
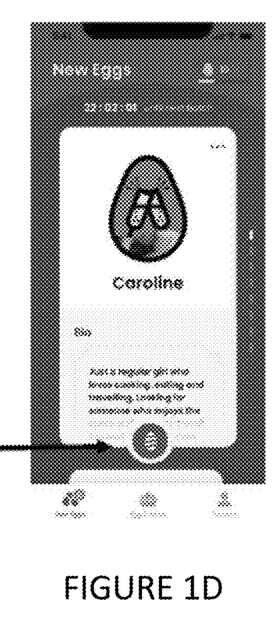

If the answers from the user and Caroline match, in FIG. 1C, a portion of Caroline's picture may be revealed to the user, and in FIG. 1D, the user may be presented with a portion of Caroline's profile. At the same time, Caroline would be presented with a portion of the user's picture and a portion of the user's profile.

The portion of the picture that may be revealed may vary. In one embodiment, the reveal may start from the bottom and move upward; the reveal may start at the top and move down; the reveal may move from one side to the other; the reveal may be random; etc.

In one embodiment, the picture may be analyzed so that the portion with the greatest number of distinguishing features, such as eyes, are not revealed until the last match is made. The order in which the features are revealed may be based on an algorithm. Similarly, the first reveal may include the fewest number of distinguishing features, such as hair.

In another embodiment, the computer program may identify primary, features, secondary features, and ancillary elements in the pictures. Primary features may include, for example, the face, hair, etc. Secondary features may include anything associated with a body from the neck down. And ancillary elements may include the photo backdrop, other people in image, elements that do not have anything to do with the face or body, etc.). For example, the ancillary elements may be revealed first, then the secondary features, and then the primary features. In another embodiment, the ancillary elements may not be obscured or covered; the reveal will involve the secondary features followed by the primary features. Any suitable method of revealing the features in the photo may be used as is necessary and/or desired.

In one embodiment, the user profile may also be analyzed to identify certain features. For example, the user's age, city, state, etc. may be revealed initially, while the user's interests, employment, etc. may be revealed subsequently, or vice-versa.

The question that the user just answered, and its respective tier level may be stored and may be used to present more curated matches moving forward based on how other users answered that question.

When both users are at a first match level (e.g., after answering a first question the same and can only see the bottom 25% of their match's picture and limited profile details), the users may be presented with a second question. If both users answer the same, a second portion of each other's picture and profile (e.g., an additional 25% for a total of 50%) may be revealed.

The question and answer may be stored and used for future matches.

This process may be repeated several times (e.g., a total of 4 times) with additional reveals (e.g., 50%, 75%, 100%), sequentially, to reveal their match's entire photo and profile details.

Once matches see 100% of their match's picture and profile details, they may be provided with a chat interface to chat.

In one embodiment, instead of matching responses to questions, certain questions may require different answers in order to proceed with the reveal. For example, users may choose if they want the matches to answer questions the same way, or differently.

In one embodiment, matches to certain questions may result in additional reveals. For example, if both users are at 0% and answer a certain question the same way (either match or not match, depending on preferences), the 25% reveal may be skipped, and both users may be presented with the 50% reveal.

It should be noted that the different reveal levels (e.g., 0%, 25%, 50%, 75%, and 100%) as well as the number of questions (e.g., 4) are exemplary only and different reveal levels, including non-uniform reveals (e.g., 10%, 25%, 50%, 60%, 80%, 100%) may be used as is necessary and/or desired.

Figure 2:
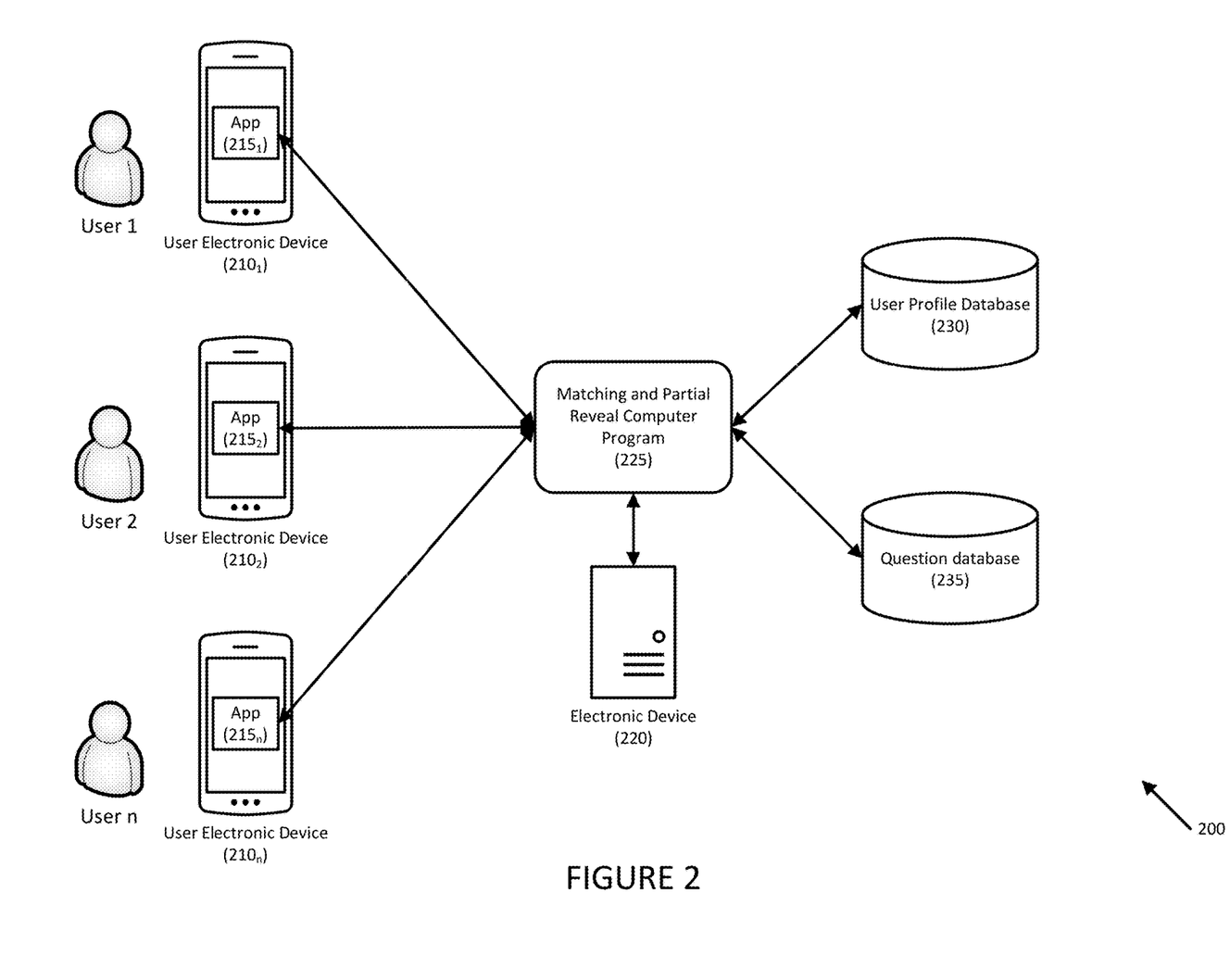
FIG. 2 depicts a system for social matching with partial, conditional picture reveal according to an embodiment.

Referring to FIG. 2, a system for social matching with partial, conditional picture reveal is provided according to an embodiment. System 200 may include electronic device 220, which may be a server (e.g., physical and/or cloud-based) that may execute matching and partial reveal computer program 225. Matching and partial reveal computer program 225 may interface with a plurality of computer programs (e.g., app $215_1$, app $215_2$, ... app $215_n$) executed by user electronic devices 210 (e.g., user electronic device $210_1$, user electronic device $210_2$, ... $210_n$) executed by users (e.g., user 1, user 2, ... user n).

Matching and partial reveal computer program 225 may also interface with user profile database 230, which may store, for example, self-profiles, matching profiles, pictures, and historical answers for user 1, user 2, ... user n.

Matching and partial reveal computer program 225 may include a plurality of computer programs (e.g., one for matching, one for partial reveal, etc.). Other arrangements may be provided as is necessary and/or desired.

Question database 235 may store questions that may be presented to users 1, 2, ... n. Examples of such questions may include questions seeking to elicit the users' thoughts on dating, money, cohabitation, marriage, children, divorce, etc. The questions may be curated, for example, by dating and/or relationship experts.

Figure 3:
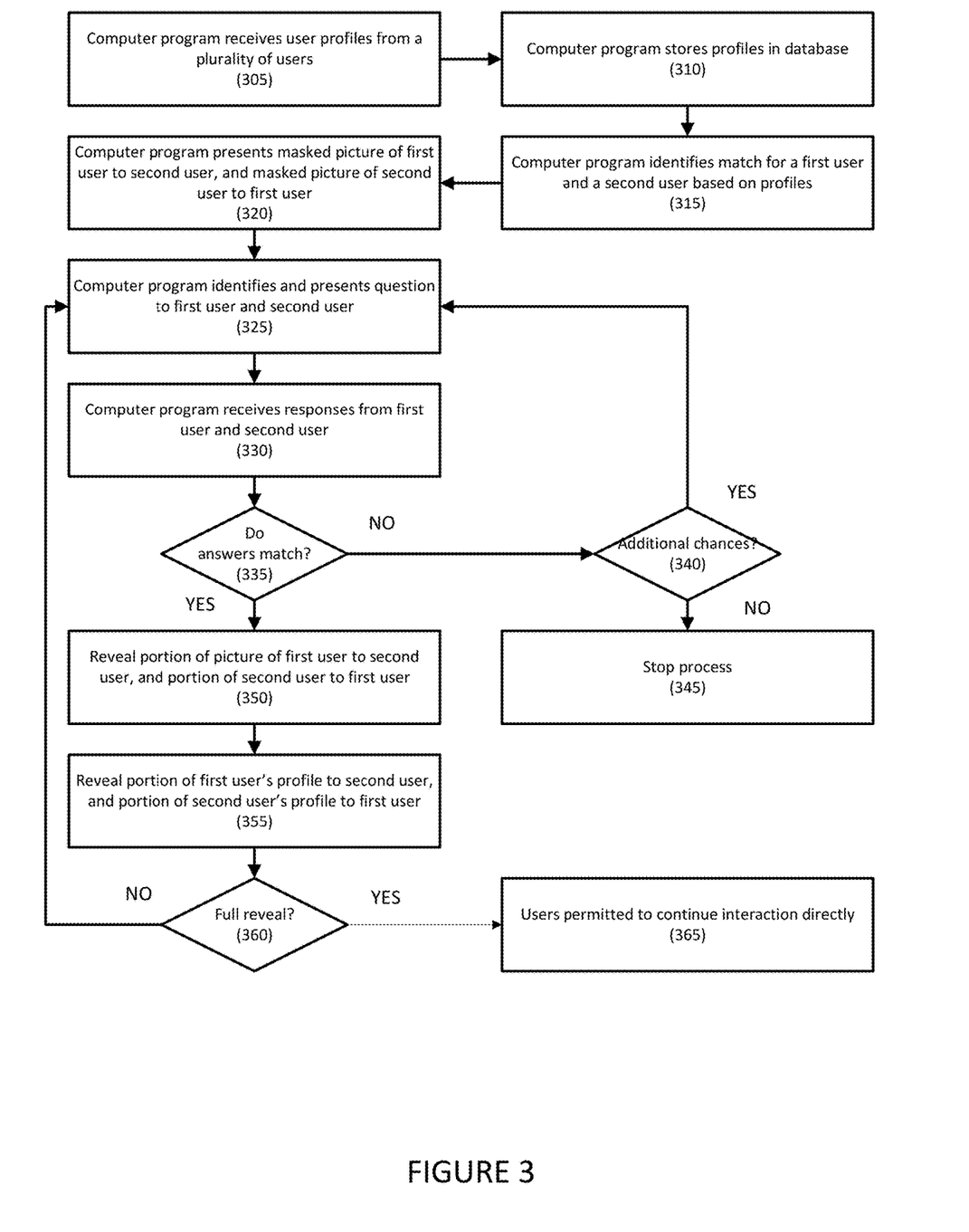
FIG. 3 depicts a method for social matching with partial, conditional picture reveal according to an embodiment.

Referring to FIG. 3, a method for social matching with partial, conditional picture reveal according to an embodiment.

In step 305, a computer program executed by an electronic device may receive user profiles from a plurality of users. The users may submit their information via computer applications executed on the users' electronic devices. The users may also submit pictures, such as a head shot, to the computer program.

In step 310, the computer program may store the user profiles in a database.

In step 315, the computer program may identify a match for a first user and a second user. For example, an algorithm may match the two users using the information in the users' profiles.

In step 320, the computer program may present a picture of the first user that is masked with a graphic or obscured to the second user, and picture of the second user that is masked with a graphic or obscured to the first user. For example, the pictures may be masked with a graphic, may be obscured, blurred, etc.

In step 325, the computer program may identify and present a question to the first user and the second user. In one embodiment, the question may be based on information in one of the users' profiles, may be based on a database of dating and relationship questions, etc. The question may require a multiple choice answer, a yes or no answer, etc.

In step 330, the computer program may receive responses from the first user and the second user.

In step 335, the computer program may determine if the answer match. If they do not, in step 340, the computer program may check to see if one or both of the users have an additional chance to continue the process. For example, the users may be allowed to have one mismatched answer and still continue.

If the users do not have any additional chances, in step 345, the process may stop. The computer program may update the users' records with the result.

In step 350, if the answers match, the computer program may reveal a portion of picture of the first user to the second user, and a portion of the second user to the first user. The portion revealed may be based, for example, of features/elements identified in the pictures (e.g., primary features, secondary features, ancillary elements, etc.).

For example, the reveal may start form the bottom and move upward; the reveal may start at the top and move down; the reveal may move from one side to the other; the reveal may be random; etc.

As another example, the picture may be analyzed so that the portion with the greatest number of distinguishing features, such as eyes, are not revealed until the last match is made. The order in which the features are revealed may be based on an algorithm. Similarly, the first reveal may include the fewest number distinguishing features, such as hair.

As yet another embodiment, the computer program may identify primary, features, secondary features, and ancillary elements in the pictures. Primary features may include, for example, the face, hair, etc. Secondary features may include anything associated with a body from the neck down. And ancillary elements may include the photo backdrop, other people in image, elements that do not have anything to do with the face or body, etc.). For example, the ancillary elements may be revealed first, then the secondary features, and then the primary features. In another embodiment, the ancillary elements may not be obscured or covered; the reveal will involve the secondary features followed by the primary features. Any suitable method of revealing the features in the photo may be used as is necessary and/or desired.

In step 355, the computer program may reveal a portion of first user's profile to second user, and portion of second user's profile to first user. The portion of the profile that may be revealed may vary. For example, each user's age, city, state, etc. may be revealed initially, while the users' interests, employment, etc. may be revealed subsequently, or vice-versa.

In step 360, the computer program may check to see if the pictures have been fully revealed. If they have, in step 365, the users may elect to continue their interaction directly. For example, the users may be provided with a chat interface to communicate directly with each other.

If the pictures have not been fully revealed, the process may return to step 325.

Figure 4:
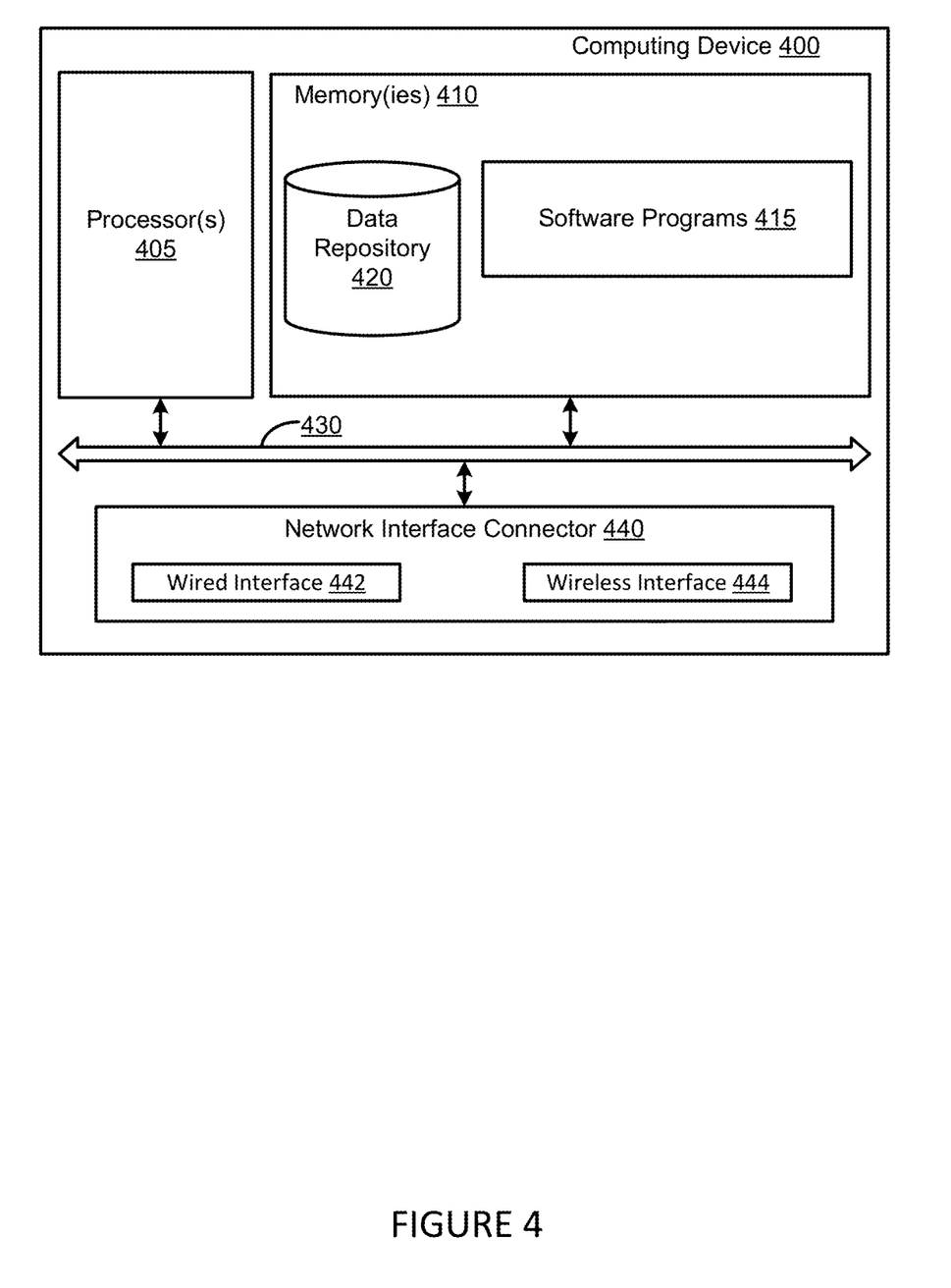
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for social matching with partial, conditional picture reveal, comprising:
    receiving, by a computer program, a profile and a picture from a plurality of users;
    identifying, by the computer program, a potential match between a first user and a second user based on the profiles;
    presenting, by the computer program, a picture of the first user to a second user electronic device associated with the second user, and a picture of the second user to a first user electronic device associated with the first user, wherein the picture of the first user and the picture of the second user are obscured or covered;
    presenting, by the computer program, a first question to the first user electronic device and the second user electronic device;
    receiving, by the computer program, responses to the first question from the first user electronic device and the second user electronic device;
    comparing, by the computer program, the responses to the first question from the first user electronic device and the second user electronic device;
    determining, by the computer program and based on the comparison of the responses to the first question, that the responses to the first question meet a first matching criteria for the first question;
    revealing, by the computer program, a first portion of a plurality of portions of the picture of the first user to the second user electronic device and a first portion of a plurality of portions of the picture of the second user to the first user electronic device, wherein a remaining plurality of portions of the pictures remain obscured or covered;
    repeating, by the computer program, the steps of presenting, receiving, comparing, determining, and revealing until all of the plurality of portions of the picture of the first user are revealed to the second user, and all of the plurality of portions of the picture of the second user are revealed to the first user.

2. The method of claim 1, wherein repeating, by the computer program, the steps of presenting, receiving, comparing, determining, and revealing until all of the plurality of portions of the picture of the first user are revealed to the second user, and all of the plurality of portions of the picture of the second user are revealed to the first user comprises:
- presenting, by the computer program, a second question to the first user electronic device and the second user electronic device;
- receiving, by the computer program, responses to the second question from the first user electronic device and the second user electronic device;
- comparing, by the computer program, the responses to the second question from the first user electronic device and the second user electronic device;
- determining, by the computer program and based on the comparison of the responses to the first question, that the responses to the second question meet a second matching criteria for the second question; and
- revealing, by the computer program, a second portion of the picture of the first user to the second user electronic device and a second portion of the picture of the second user to the first user electronic device, wherein a second remaining portion of the pictures remain obscured or covered.

3. The method of claim 1, wherein the computer program receives a cover graphic with each profile and picture, and the picture of the first user and the picture of the second user are obscured by the cover graphic received from the respective user.

4. The method of claim 1, further comprising:
- identifying, by the computer program, primary features and secondary features in each picture, wherein the primary features comprise facial features and hair, and the secondary features comprise body features below a user neck.

5. The method of claim 3, wherein the first portion of the picture of the first user and the first portion of the second user comprise secondary features, and the second portion of the picture of the first user and the second portion of the picture of the second user comprises primary features.

6. The method of claim 1, further comprising:
- presenting, by the computer program, a first portion of the profile for the first user to the second user, and a first portion of the profile of the second user to the first user, in response to the first question meeting the first matching criteria.

7. The method of claim 6, further comprising:
- presenting, by the computer program, a second portion of the profile for the first user to the second user, and a second portion of the profile of the second user to the first user, in response to the second question meeting the second matching criteria.

8. The method of claim 1, wherein the first matching criteria and the second matching criteria comprise matching or not matching.

9. A system comprising:
- a plurality of user electronic devices, each user electronic device associated with a user and executing a computer application; and
- an electronic device executing a matching and partial reveal computer program, wherein the matching and partial reveal computer program are in communication with the plurality of computer applications, wherein the matching and partial reveal computer program receives a profile and a picture from a plurality of users; identifies a potential match between a first user and a second user based on the profiles; presents a picture of the first user to a second user electronic device associated with the second user, and a picture of the second user to a first user electronic device associated with the first user, wherein the picture of the first user and the picture of the second user are obscured or covered; presents a first question to the first user electronic device and the second user electronic device; receives responses to the first question from the first user electronic device and the second user electronic device; compares the responses to the first question from the first user electronic device and the second user electronic device; determines, based on the comparison of the responses to the first question, that the responses to the first question meet a first matching criteria for the first question; reveals a first portion of a plurality of portions of the picture of the first user to the second user electronic device and a first portion of a plurality of portions of the picture of the second user to the first user electronic device, wherein a remaining plurality of portions of the pictures remain obscured or covered; and repeats the presenting, receiving, comparing, determining, and revealing until all of the plurality of portions of the picture of the first user are revealed to the second user, and all of the plurality of portions of the picture of the second user are revealed to the first user.

10. The system of claim 9, wherein the matching and partial reveal computer program repeats the presenting, receiving, comparing, determining, and revealing until all of the plurality of portions of the picture of the first user are revealed to the second user, and all of the plurality of portions of the picture of the second user are revealed to the first user by presenting a second question to the first user electronic device and the second user electronic device; receiving responses to the second question from the first user electronic device and the second user electronic device; comparing the responses to the second question from the first user electronic device and the second user electronic device; determining, based on the comparison of the responses to the second question, that the responses to the second question meet a second matching criteria for the second question; and revealing a second portion of the picture of the first user to the second user electronic device and a second portion of the picture of the second user to the first user electronic device, wherein a second remaining portion of the pictures remain obscured or covered.

11. The system of claim 9, wherein the matching and partial reveal computer program receives a cover graphic with each profile and picture, and the picture of the first user and the picture of the second user are obscured by the cover graphic received from the respective user.

12. The system of claim 9, wherein the matching and partial reveal computer program further identifies primary features and secondary features in each picture, wherein the primary features comprise facial features and hair, and the secondary features comprise body features below a user neck.

13. The system of claim 12, wherein the first portion of the picture of the first user and the first portion of the second user comprise secondary features, and the second portion of the picture of the first user and the second portion of the picture of the second user comprises primary features.

14. The system of claim 9, wherein the matching and partial reveal computer program further presents a first portion of the profile for the first user to the second user electronic device, and a first portion of the profile of the second user to the first user electronic device, in responses to the first question meeting the first matching criteria.

15. The system of claim 14, wherein the matching and partial reveal computer program further presents a second portion of the profile for the first user to the second user electronic device, and a second portion of the profile of the second user to the first user electronic device, in responses to the second question meeting the second matching criteria.

16. A non-transitory computer readable storage medium, including instructions stored thereon, which when read and executed by one or more computer processors, cause the one or more computer processors to perform steps comprising:
    receiving a profile and a picture from a plurality of users;
    identifying a potential match between a first user and a second user based on the profiles;
    presenting a picture of the first user to a second user electronic device associated with the second user, and a picture of the second user to a first user electronic device associated with the first user, wherein the picture of the first user and the picture of the second user are obscured or covered;
    presenting a first question to the first user electronic device and the second user electronic device;
    receiving responses to the first question from the first user electronic device and the second user electronic device;
    comparing the responses to the first question from the first user electronic device and the second user electronic device;
    determining, based on the comparison of the responses to the first question, that the responses to the first question meet a first matching criteria for the first question, wherein the first matching criteria comprises matching or not matching;
    revealing a first portion of a plurality of portions of the picture of the first user to the second user electronic device and a first portion of a plurality of portions of the picture of the second user to the first user electronic device, wherein a remaining plurality of portions of the pictures remain obscured or covered; and
    repeating the steps of presenting, receiving, comparing, determining, and revealing until all of the plurality of portions of the picture of the first user are revealed to the second user, and all of the plurality of portions of the picture of the second user are revealed to the first user.

17. The non-transitory computer readable storage medium of claim 16, wherein repeating the steps of presenting, receiving, comparing, determining, and revealing until all of the plurality of portions of the picture of the first user are revealed to the second user, and all of the plurality of portions of the picture of the second user are revealed to the first user comprises instructions stored thereon, which when read and executed by one or more computer processors, cause the one or more computer processors to perform steps comprising:
    presenting a second question to the first user electronic device and the second user electronic device;
    receiving responses to the second question from the first user electronic device and the second user electronic device;
    compares the responses to the second question from the first user electronic device and the second user electronic device;
    determining, based on the comparison of the responses to the second question, that the responses to the second question meet a second matching criteria for the second question, wherein the second matching criteria comprises matching or not matching; and
    revealing a second portion of the picture of the first user to the second user electronic device and a second portion of the picture of the second user to the first user electronic device, wherein a second remaining portion of the pictures remain obscured or covered.

18. The non-transitory computer readable storage medium of claim 16, further comprising instructions stored thereon, which when read and executed by one or more computer processors, cause the one or more computer processors to receive a cover graphic with each profile and picture, and the picture of the first user and the picture of the second user are obscured by the cover graphic received from the respective user.

19. The non-transitory computer readable storage medium of claim 16, further comprising instructions stored thereon, which when read and executed by one or more computer processors, cause the one or more computer processors to identify primary features and secondary features in each picture, wherein the primary features comprise facial features and hair, and the secondary features comprise body features below a user neck.

20. The non-transitory computer readable storage medium of claim 16, further comprising instructions stored thereon, which when read and executed by one or more computer processors, cause the one or more computer processors to present a first portion of the profile for the first user to the second user, and a first portion of the profile of the second user to the first user, in responses to the first question meeting the first matching criteria, and to present a second portion of the profile for the first user to the second user, and a second portion of the profile of the second user to the first user, in responses to the second question meeting the second matching criteria.

* * * * *